(12) United States Patent
Bendig

(10) Patent No.: US 8,510,603 B2
(45) Date of Patent: Aug. 13, 2013

(54) SYSTEMS AND METHODS PROVIDING AN EXCEPTION BUFFER TO FACILITATE PROCESSING OF EVENT HANDLER ERRORS

(75) Inventor: Oliver Bendig, Forst (DE)

(73) Assignee: SAP AG, Walldorf (DE)

( * ) Notice: Subject to any disclaimer, the term of this patent is extended or adjusted under 35 U.S.C. 154(b) by 357 days.

(21) Appl. No.: 12/953,845

(22) Filed: Nov. 24, 2010

(65) Prior Publication Data

US 2012/0131392 A1    May 24, 2012

(51) Int. Cl.
*G06F 11/07* (2006.01)

(52) U.S. Cl.
USPC .............................. 714/38.1; 714/48; 714/57

(58) Field of Classification Search
USPC .............................................. 714/38.1, 57, 48
See application file for complete search history.

(56) References Cited

U.S. PATENT DOCUMENTS

| 2003/0145255 A1* | 7/2003 | Harty et al. ...................... 714/48 |
| 2006/0190355 A1* | 8/2006 | Jammes et al. .................. 705/27 |
| 2007/0168753 A1* | 7/2007 | Herter et al. ..................... 714/42 |
| 2008/0270438 A1* | 10/2008 | Aronson et al. ............. 707/101 |
| 2009/0024880 A1* | 1/2009 | Klein .............................. 714/49 |
| 2009/0248949 A1* | 10/2009 | Khatri et al. ...................... 711/6 |
| 2010/0125831 A1 | 5/2010 | Bendig |
| 2010/0180274 A1* | 7/2010 | Cherian et al. .................... 718/1 |
| 2010/0218169 A1* | 8/2010 | Andersen et al. ............. 717/125 |
| 2010/0312888 A1* | 12/2010 | Alon et al. ..................... 709/224 |
| 2011/0197090 A1* | 8/2011 | Colbert et al. ..................... 714/2 |

OTHER PUBLICATIONS

J.D. Meier et al., "Use a Global Exception Handler to Catch Unhandled Exceptions", Jan. 17, 2009, Microsoft patterns and practices, retrieved date Aug. 24, 2010, download from mhtml:file://C:/Documents and Setters\wioletta\Local\Settings\Temp\Temporary\Director..., 2pgs.
"Standard ML", Wikipedia, the free encyclopedia, retrieved date Aug. 24, 2010, download from mhtml:file://C:/Documents and Setters\wioletta\Local\Settings\Temp\Temporary\Director . . . , 15pgs, Jun. 2, 2010.

* cited by examiner

*Primary Examiner* — Chae Ko
(74) *Attorney, Agent, or Firm* — Buckley, Maschoff & Talwalkar LLC

(57) ABSTRACT

According to some embodiments, an application may call an event handler. The event handler may determine that an error has occurred within the event handler and store information associated with the error into an exception buffer. A pulling mechanism of the application may detect the stored information associated with the error, and, as a result, information associated with the error may be retrieved from the exception buffer.

19 Claims, 5 Drawing Sheets

SYSTEMS AND METHODS PROVIDING AN EXCEPTION BUFFER TO FACILITATE PROCESSING OF EVENT HANDLER ERRORS

FIELD

Some embodiments relate to errors associated with an event handler. More specifically, some embodiments are associated with systems and methods providing an exception buffer to facilitate processing of event handler errors.

BACKGROUND

In some programming environments, an application may call an event handler to perform certain tasks. For example, an application might call an event handler associated with a User Interface ("UI"). The event handler may, in some cases, detect that an error has occurred. For example, a parameter entered by a user via a UI might be outside of an allowable range of values. One way to handle such an error is to have the event handler display an error message to the user via the UI. This technique, however, might result in an error message that may not be easily understood by the user. Moreover, it may mix user interaction logic with business logic which can be lead to errors and difficult to understand software.

As another way of handling the error, the event handler might raise an exception to be handled by the application. This approach may also have several disadvantages. For example, a pending error exception might be overwritten by a subsequent error detected by the event handler. Moreover, event handlers may be associated with signatures that list all input parameters, output parameters, and exceptions associated with the event handler. When multiple parties use such an event handler, each party may need to continuously update the signature (and associated software) to include new exceptions that are being added by other parties. Such an approach can be a time consuming and error prone process.

Accordingly, systems and methods to automatically and efficiently facilitate the processing of event handler errors may be provided in association with some embodiments described herein.

DETAILED DESCRIPTION

Figure 1:
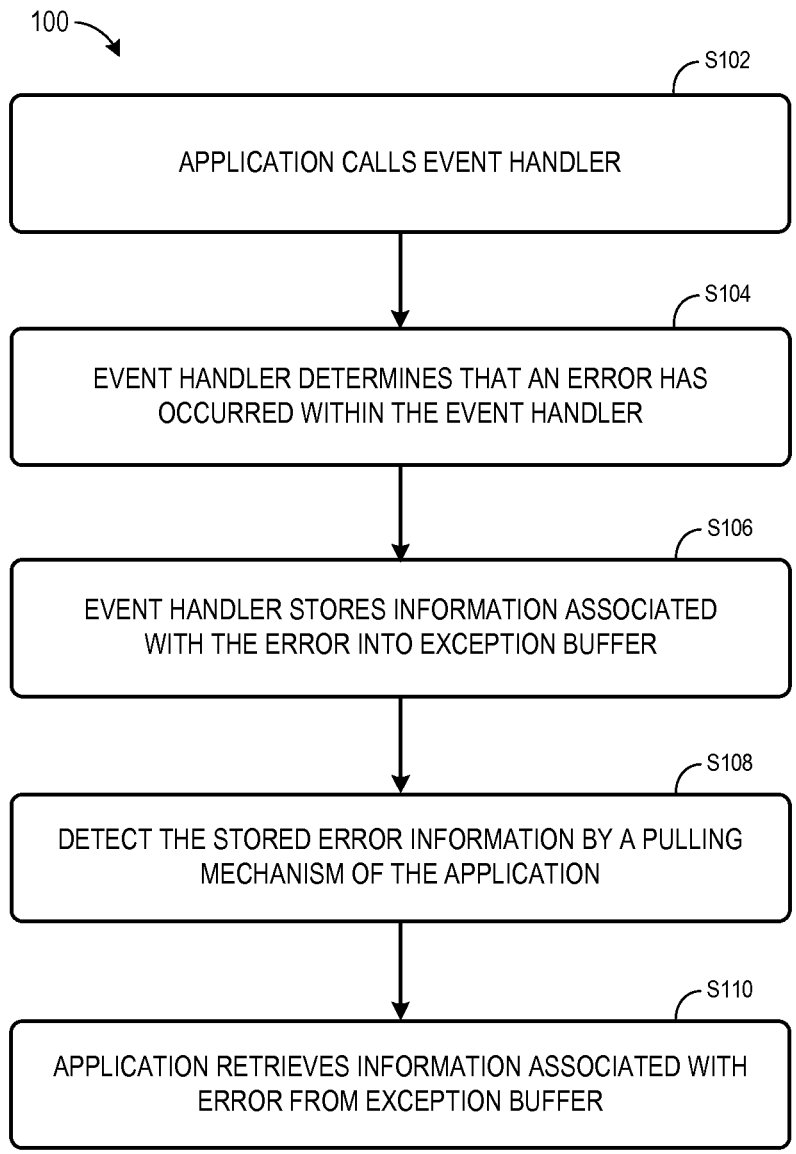
FIG. 1 is a flow diagram of a process in accordance with some embodiments.

In some programming environments, such as an Advanced Business Application Programming ("ABAP") programming environment, an application may call an event handler to perform certain tasks. Moreover, the event handler may, in some cases, detect that an error has occurred. Some embodiments described herein provide systems and methods to automatically and efficiently facilitate the processing of event handler errors. For example, FIG. 1 is a flow diagram of a process 100 in accordance with some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S102, an application may call an event handler. For example, a business application might call an event handler associated with a graphical UI. At S104, the event handler may determine that an error has occurred within the event handler. For example, a parameter used by the event handler might be outside of an allowable range of values. At S106, the event handler may store information associated with the detected error into an exception "buffer." As used herein, an exception "buffer" may refer to any structure that may store information, including tables, repositories, queues, etc. As described in connection with FIG. 2, according to some embodiments the exception buffer is associated with a static internal table of an exception buffer class, and the internal table may store references to exception objects. According to some embodiments, an event handler may create an exception object containing details about the error and stores the exception object into the exception buffer.

At S108, a pulling mechanism of the application may detect the stored information associated with the error. For example, the application may periodically check to see if new event information is available in the exception buffer. According to some embodiments, the application may indirectly detect the error information by detecting a stored exception in exception buffer (and therefore detect the error). At S110, the application may retrieve information associated with the error from the exception buffer. For example, the application may retrieve the information and determine an appropriate error message to display to a user of a UI. According to some embodiments, the application may retrieve information via an exception object from exception buffer.

According to some embodiments, information associated with multiple exceptions, each associated with an error, may be stored within the exception buffer. Moreover, the information might be stored, for example, in chronological order. Note that the plurality of exceptions might be associated with, according to some embodiments, different event handlers. In addition, the application may manage the plurality of exceptions in the exception buffer during execution of the application. For example, the application might retrieve information about an exception and determine an appropriate error message to display to a user.

Note that the use of an object oriented design paradigm may help create well structured applications (e.g., the applications may be easier to extend and/or maintain). Moreover, error handling with class-based exceptions may provide many advantages as compared to functional programming models. One concept in the object oriented design paradigm is the use of event handlers. For example, when a button is clicked on a UI an event may be raised and an event handler may provide an appropriate action for that event.

Further note that with some languages, such as ABAP, there may be no class-based exceptions supported in the interface of an event. If the event handler is called, and an error occurs during the handling of that event, the handler may not be able to raise an error for the application. To get around such a limitation, an error message could be directly displayed by the event handler on the screen of the UI. Such a solution, however, may mix user interactions with business logic (which can lead to errors) and or result in confusing error messages to the user. In addition, it may be difficult to find errors (e.g., because there may be many different places in the code where errors could occur). According to some embodiments, the exception buffer may provide a single place that can be looked to for error information. Also note that error messages or other UI features within business logic may prevent the business logic from being re-used in situations where no UI features are permitted.

As another way of handling an error, an instance attribute might be provided for a class, and the exception reference could be provided from the event handler within that. This technique also has several disadvantages. For example, only a single exception might be handled (e.g., if a new exception is raised before the old exception is handled, the old exception might be overwritten). Moreover, for the event handlers of every class, another instance attribute may need to be created. For example, an application may use more than one class with different event handlers. In this case, the application may need to check each classes instance attribute for a potential exception. Further, when there are multiple classes with different exceptions, the application might not be able to determine which exception occurred first. Still further, it may be difficult to understand a global overview when debugging exceptions during an application's lifetime.

Figure 2:
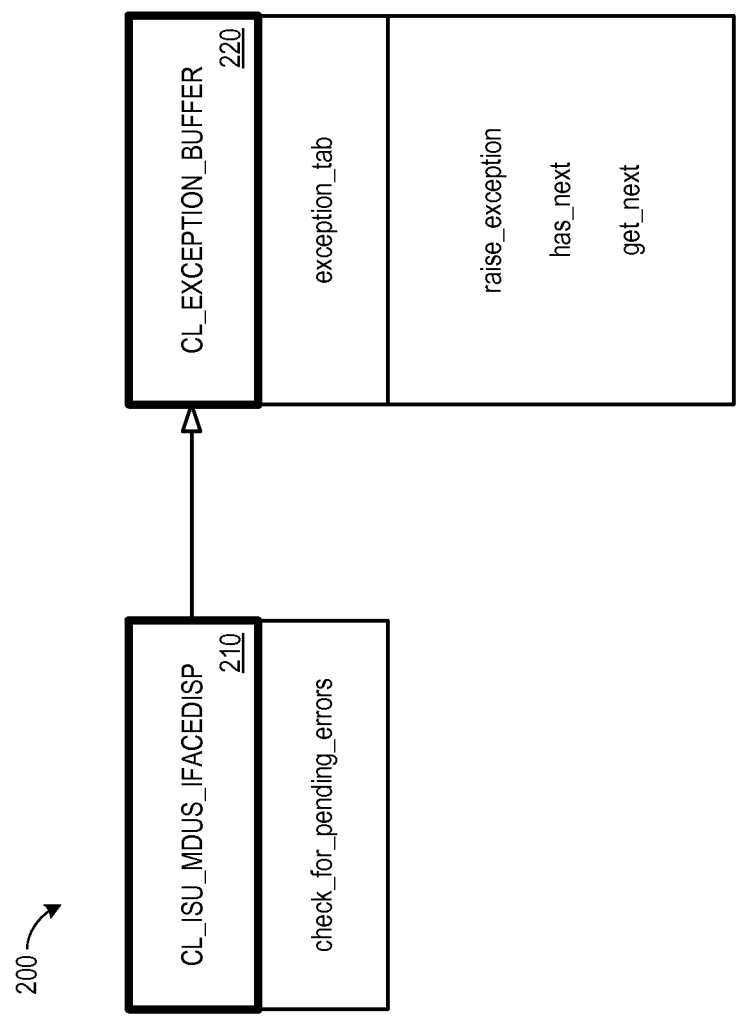
FIG. 2 illustrates class relationships according to some embodiments.

According to some embodiments, an exception may be caught within an event handler and stored separately. Outside of the event handler, a pulling mechanism may catch pending exceptions and, for example, arrange for an appropriate message to be displayed to a user. For example, FIG. 2 illustrates class relationships 200 according to some embodiments. In particular, the relationships 200 include a class cl_isu_m-dus_ifacedisp 210 that uses a class cl_exception_buffer 220. According to some embodiments, the class cl_exception_buffer 220 is only used by the class cl_isu_mdus_ifacedisp 210 and contains business logic for a maintenance transaction. That class might, for example, provide event handlers for a UI such as an ABAP list viewer table. But to separate the view of the UI from the business logic, the class may avoid any user interaction (e.g., error messages or other communications to the user may be performed outside the class). According to some embodiments, a consistency check performed by the business logic may lead to an error exception. For example, a user might not be allowed to delete a particular line from an ABAP list viewer table. When the user attempts to delete that particular line, the event handler for a "delete" button may raise such an error exception so that an appropriate error message may be provided to the user.

The new class cl_exception_buffer 220 may have an internal table to store references to exception objects. This might comprise, for example, a static table and every exception might be appended to the table. According to some embodiments, when a debugging mode is entered, the table may be accessed and each raised exception during the application's lifetime may be viewed. Even if an exception was raised several minutes ago and/or other errors have occurred in between, information about prior exceptions may be accessed (e.g., including a reference to a source position where each exception was raised and/or a reason for each exception). Such an approach may simplify debugging. For example, when an error occurs a programmer may need to set breakpoints in the coding and reproduce the error to find out more information about it. According to some embodiments, a programmer may simply look into the exception buffer (without needing to recreate the error).

According to some embodiments, there may be three methods in the class cl_exception_buffer 220: one to store the exception to the internal table and two methods to retrieve them back into the application. At the end of an event handler, the event handler may catch an occurred exception and call a "raise_exception" method of the class cl_exception_buffer 220 with a reference to the caught exception.

The application may then detect the raised exception using a pulling mechanism. For example, the main loop of an application may continuously check for new exceptions using a "has_next" method of class cl_exception_buffer 220. If the method returns "true" (meaning that an error occurred), the application may call a "get_next" method, obtain the stored exception and throw a new exception with the stored exception appended. A report outside can catch this exception, unpack information about the stored exception and provide a suitable error message for the communication to the user.

Note that if there are different classes with different event handlers (and many exceptions may have occurred before the pulling method is executed), the exceptions may be stored in chronological order in the internal table. In this way, the get_next method may, according to some embodiments, return the next chronological exception as long as there are more exceptions within the buffer. According to some embodiments, the application may not need to each single class for exceptions. With the use of class cl_exception_buffer 220 there is only one point to ask in connection with new exceptions.

Figure 3:
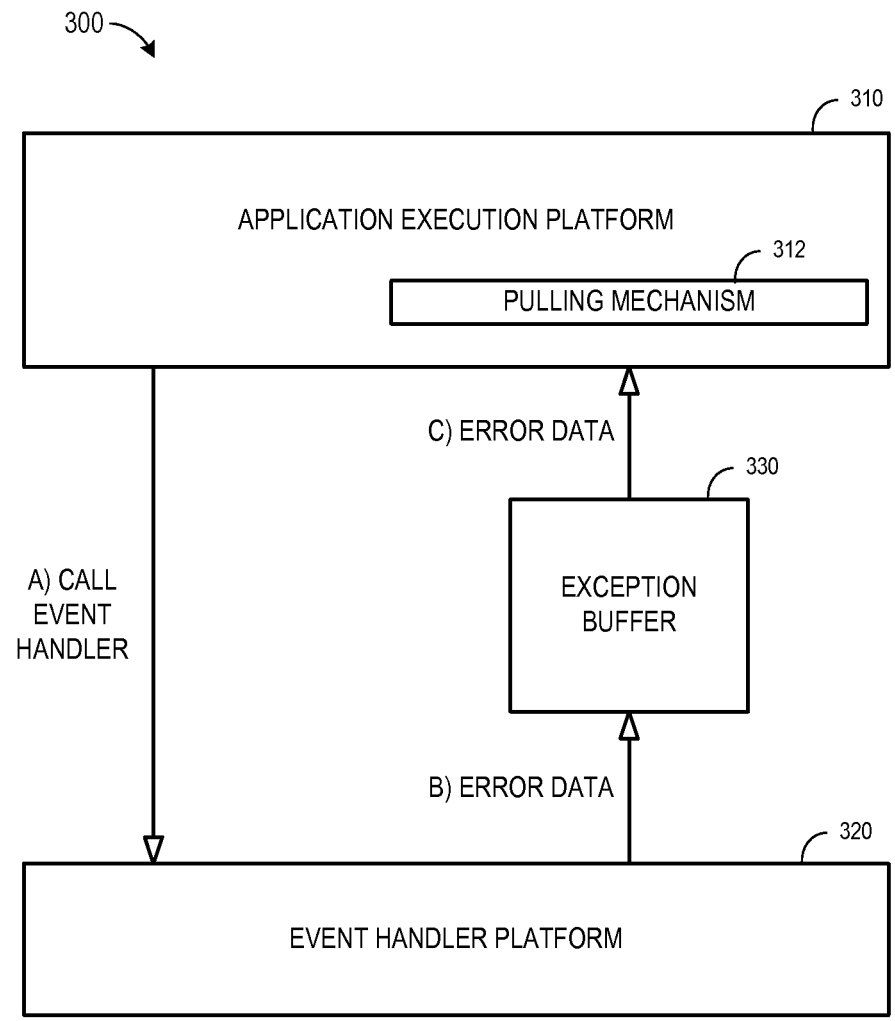
FIG. 3 is a block diagram of a system in accordance with some embodiments.

FIG. 3 is a block diagram of a system 300 in accordance with some embodiments. In particular, an application execution platform 310 may execute an application and call an event handler platform 320 at (A). Note that the application execution platform 310 and event handler platform 320 may execute at a single processing system.

The event handler platform 320, when called by the application execution platform 310, may execute the event handler and determine that an error has occurred within the event handler. The event handler platform 320 may also store information associated with the error into an exception buffer 330 at (B).

The application execution platform 310 may further include a pulling mechanism 312 (e.g., to detect when error information is available) and retrieve information associated with the exception from the exception buffer 330 at (C). According to some embodiments, the exception buffer 330 may store information about a plurality of exceptions associated with a plurality of errors and/or event handlers.

Figure 4:
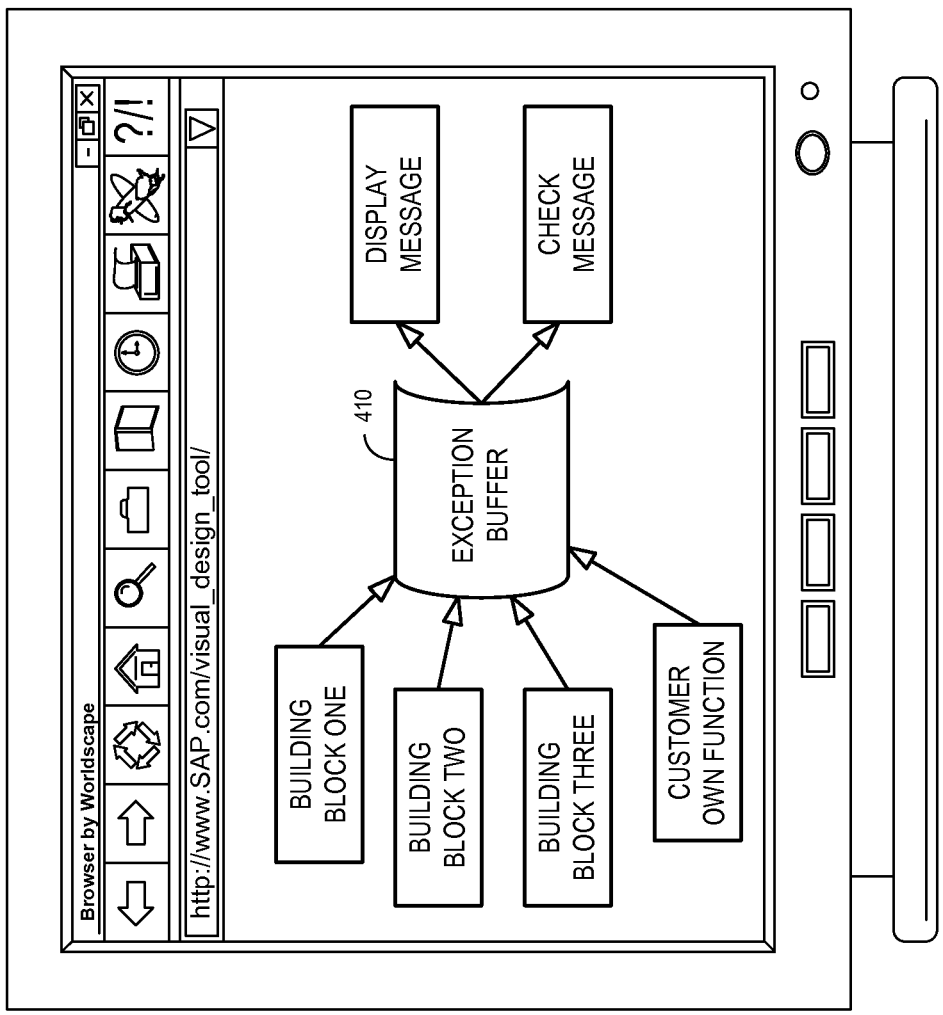
FIG. 4 illustrates a user interface associated with a visual programming language according to some embodiments.

According to some embodiments, a visual programming tool may include a representation of the exception buffer 330 and a programmer may graphically associate the representation of the exception buffer 330 with the event handler. For example, FIG. 4 illustrates a UI 400 that includes a graphical exception buffer representation 410 associated with a visual programming language according to some embodiments.

Note that when a program is written, a programmer may need to deal with error situations. In object oriented languages, the concept of exception may be used to handle abnormal situations during the program runtime. A visual programming language such as one associated with the UI 400 may provide visual representations of building block components (including in some cases functions written by a third party, such as a customer) that may be tied together. With exception buffer representation 410, reused components may not need to throw exceptions (as is the usual approach in object oriented languages) but may instead put exceptions into the exception buffer.

The application may then periodically look into the exception buffer to see if a new exception has been stored there. The programmer may reuse many different components, but the components may always access a single exception buffer representation 410 to deal with errors. According to some embodiments, a framework could provide common functions associated with the exception buffer representation 410 (e.g., "if there is an exception, automatically display it on the screen and call method xy of the application program to continue"). Such components and functions may be associated with the exception buffer representation 410 via drag and drop operations. The programming environments provide some generic building blocks for different use cases (e.g., select a business partner from a database, a show billing document, and/or trigger a creation of an invoice). These building blocks may be chosen depending on business needs and combined together to create a business transaction. A programmer may drag and drop a relation from one of these building blocks to the exception buffer representation 410. If an exception occurs in the building block, the exception is automatically dropped into exception buffer representation 410.

There might also be building blocks to deal with exceptions in the exception buffer representation 410 (e.g., to automatically drop a message from the exception to a user). Another building block might "check the exception, and if a measured value is not found during billing simulation, then skip the error, generate an estimated value and use that value for further processing of the billing simulation." With this approach, the visual programming environment can provide an error handling infrastructure to a programmer. Moreover, the programmer might not need to invest much effort dealing with each error individually but may instead use the exception buffer representation 410 to globally define some simple error-handling rules.

Figure 5:
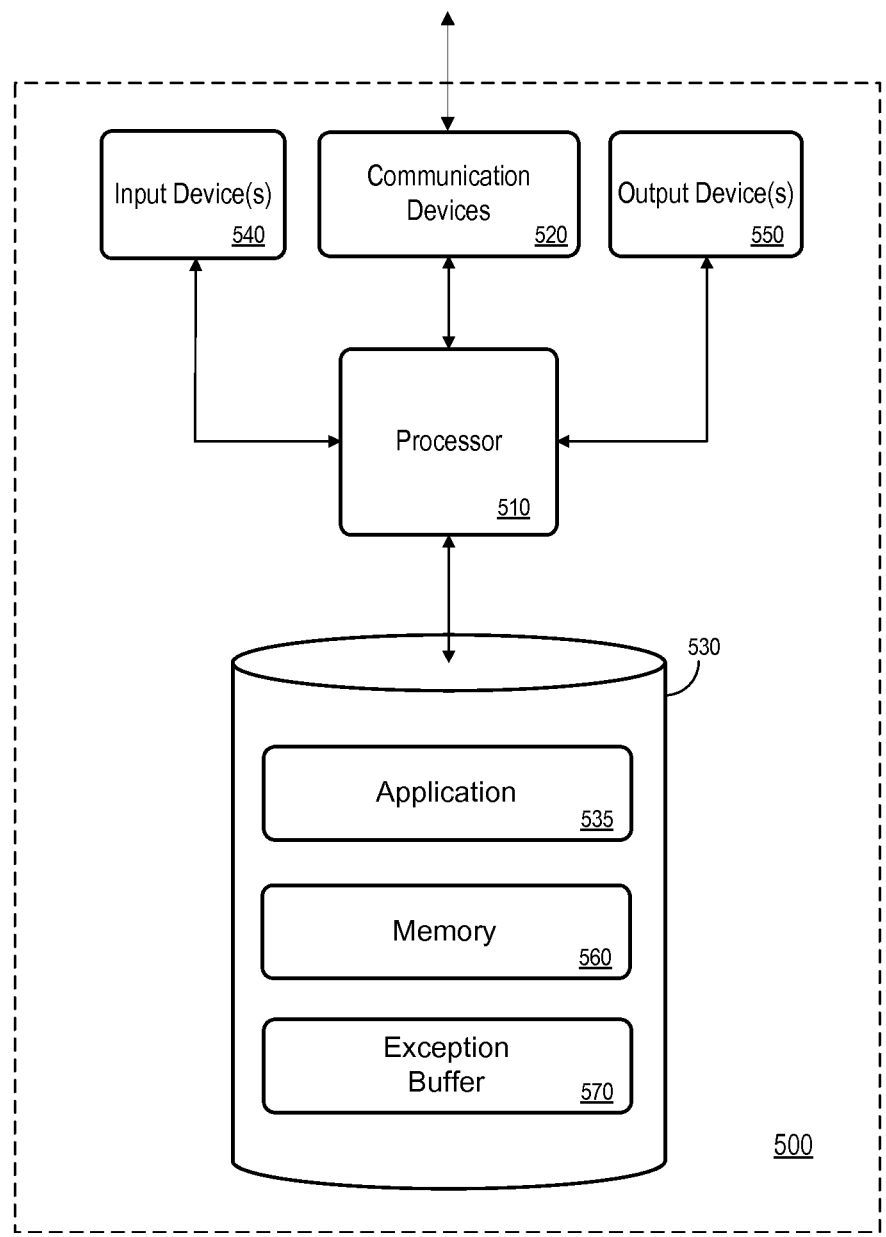
FIG. 5 is a block diagram of a system according to some embodiments.

The processes described herein with respect to FIGS. 1 through 4 may be executed by any number of different hardware systems and arrangements. For example, FIG. 5 is a block diagram of a system 500, such as a system 500 associated with an ABAP application and/or event handlers in accordance with some embodiments. The system 500 may include a processor 510, such as one or more Central Processing Units ("CPUs"), coupled to communication devices 520 configured to communicate with remote devices (not shown in FIG. 5). The communication devices 520 may be used, for example, to exchange business information with remote devices. The processor 510 is also in communication with an input device 540. The input device 540 may comprise, for example, a keyboard, computer mouse, and/or a computer media reader. Such an input device 540 may be used, for example, to receive inputs from a user via a UI (e.g., when he or she clicks a button on the UI). The processor 510 is also in communication with an output device 550. The output device 550 may comprise, for example, a display screen or printer. Such an output device 550 may be used, for example, to provide outputs to a user via a UI (e.g., by displaying an error message to the user on the UI).

The processor 510 is also in communication with a storage device 530. The storage device 530 may comprise any appropriate information storage device, including combinations of magnetic storage devices (e.g., hard disk drives), optical storage devices, and/or semiconductor memory 560. The storage devices may have different access patterns, such as Random Access Memory (RAM) devices, Read Only Memory (ROM) devices and combined RAM/ROM devices.

As used herein, information may be "received" by or "transmitted" to, for example: (i) the system 500 from other devices; or (ii) a software application or module within the system 500 from another software application, module, or any other source.

The storage device 530 stores an application 535 for controlling the processor 510. The processor 510 performs instructions of the application 535, and thereby operates in accordance any embodiments of the present invention described herein. For example, the processor 510 may arrange for an application to call an event handler. The event handler may determine that an error has occurred within the event handler and store information associated with the error into an exception buffer 570. A pulling mechanism of the application may detect that error information is available, and, as a result, information associated with the exception may be retrieved from the exception buffer 570.

Thus, systems and methods to automatically and efficiently facilitate the processing of event handler errors may be provided in association with some embodiments described herein.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the buffers described herein may be split apart or stored in other systems). Moreover, although examples of specific types of error handling have been described, embodiments of the present invention could be used with other types of error handling. For example, in some cases an application might handle an error without displaying any message to the end user. As other examples, error-messages could be provided in a log-file for inspection by administrator. As still another example, an exception might communicate a numeric value to the application indicating an error's significance (e.g., an error having a value of 0 might be less important as compared to an error having a value of 1). In this case, exceptions stored in a buffer might be prioritized when handled.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method implemented by a computing system in response to execution of program code by a processor of the computing system, the method comprising:
   calling, by an application, an event handler;
   determining, by the event handler, that an error has occurred within the event handler;
   storing, by the event handler, information associated with the error into an exception buffer;
   detecting the stored error information by a pulling mechanism of the application; and
   retrieving, by the application, information associated with the error from the exception buffer, wherein the exception buffer is associated with a static internal table of an exception buffer class, and the internal table stores references to exception objects.

2. The method of claim 1, wherein a plurality of exceptions, each associated with an error, are stored within the exception buffer in chronological order.

3. The method of claim 2, wherein the plurality of exceptions are associated with a plurality of event handlers.

4. The method of claim 2, further comprising:
managing, by the application, the plurality of exceptions in the exception buffer during execution of the application.

5. The method of claim 1, wherein said detecting comprises:
using a has next method of the exception buffer class.

6. The method of claim 5, further comprising:
when the has next method of the exception buffer class equals true, using a get next method of the exception buffer class to obtain exception information from the exception buffer.

7. The method of claim 6, further comprising:
generating an additional exception with the obtained exception information.

8. The method of claim 7, further comprising:
catching the additional exception;
unpacking information associated with the additional exception; and
providing an error message to a user in response to the additional exception.

9. The method of claim 1, wherein said placing is associated with a method of the exception buffer class to append exceptions to the internal table.

10. The method of claim 1, wherein a visual programming tool includes a representation of the exception buffer and a programmer may graphically associate the representation of the exception buffer with the event handler.

11. The method of claim 1, wherein the exception buffer is further accessed in association with at least one of: (i) a debugging environment, or (ii) a report generation environment.

12. A non-transitory, computer-readable medium storing program code executable by a computer to perform a method, said method comprising:
calling, by an application, an event handler;
determining, by the event handler, that an error has occurred within the event handler;
storing, by the event handler, information associated with the error into an exception buffer;
detecting the stored error information by a pulling mechanism of the application; and
retrieving, by the application, information associated with the error from the exception buffer, wherein the exception buffer is associated with a static internal table of an exception buffer class, and the internal table stores references to exception objects.

13. The medium of claim 12, wherein a plurality of exceptions, each associated with an error, are stored within the exception buffer in chronological order.

14. The medium of claim 13, wherein the plurality of exceptions are associated with a plurality of event handlers.

15. The medium of claim 13, further comprising:
managing, by the application, the plurality of exceptions in the exception buffer during execution of the application.

16. A system, comprising:
an application execution platform to execute an application and call an event handler; and
an event handler platform to, when called by the application execution platform, (i) execute the event handler and determine that an error has occurred within the event handler and (ii) store information associated with the error into an exception buffer, wherein the exception buffer is associated with a static internal table of an exception buffer class, and the internal table stores references to exception objects; and
wherein the application execution platform is further to detect the stored error information via a pulling mechanism of the application and retrieve the information associated with the error from the exception buffer.

17. The system of claim 16, wherein a plurality of exceptions, each associated with an error, are stored within the exception buffer in chronological order.

18. The system of claim 17, wherein the plurality of exceptions are associated with a plurality of event handlers.

19. The system of claim 16, wherein the application execution platform and event handler platform execute at a single processing system.

* * * * *